(12) United States Patent
Huang

(10) Patent No.: US 12,292,817 B2
(45) Date of Patent: May 6, 2025

(54) AUTOMATIC MEMORY LEAK DETECTION

(71) Applicant: Dell Products L.P., Round Rock, TX (US)

(72) Inventor: Kongji Huang, Acton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 67 days.

(21) Appl. No.: 18/352,415

(22) Filed: Jul. 14, 2023

(65) Prior Publication Data

US 2025/0021467 A1 Jan. 16, 2025

(51) Int. Cl.
*G06F 11/362* (2025.01)

(52) U.S. Cl.
CPC .................. *G06F 11/366* (2013.01)

(58) Field of Classification Search
CPC .. G06F 11/366; G06F 11/073; G06F 11/0757; G06F 11/3419; G06F 11/3452; G06F 11/3037; G06F 11/0703; G06F 2201/81
See application file for complete search history.

(56) References Cited

U.S. PATENT DOCUMENTS

| | | | | |
|---|---|---|---|---|
| 7,870,218 B2* | 1/2011 | Dubnicki | ................ | H04L 9/40 |
| | | | | 707/831 |
| 10,162,403 B2* | 12/2018 | Petrovic | ................ | G06F 1/3293 |
| 2005/0240747 A1* | 10/2005 | Raut | ................ | G06F 12/023 |
| | | | | 711/170 |
| 2017/0011219 A1* | 1/2017 | Li | ................ | H04L 9/3234 |
| 2021/0334186 A1* | 10/2021 | Chen | ................ | H04L 43/20 |
| 2024/0160891 A1* | 5/2024 | Wang | ................ | G06N 3/045 |

\* cited by examiner

*Primary Examiner* — Matthew M Kim
*Assistant Examiner* — Matthew N Putaraksa
(74) *Attorney, Agent, or Firm* — Amin, Turocy & Watson, LLP

(57) ABSTRACT

Automatic memory leak detection is presented herein. An example method comprises, receiving, into a data slot of a defined data structure, a flow of memory usage data sent by a resource monitoring process operational on the system, in response to determining a time value exceeding a defined threshold time value, closing the data slot, based on the memory usage data included in the data slot, executing a trend analysis process using the memory usage data as an input to the trend analysis process, and in response to the trend analysis process determining a trend associated with the memory usage data, transmitting notification data representing the trend and recommendation data representing a suggestion to reverse the trend to a user equipment.

20 Claims, 12 Drawing Sheets

600 image-2022-09-08-12-15-24
08/Sep/22 5:15 AM            31 kb image-2022-09-08-12-15-44
08/Sep/22 5:15 AM            31 kb image-2022-09-08-12-22-40
08/Sep/22 5:22 AM            35 kb image-2022-09-08-12-24-28
08/Sep/22 5:24 AM            31 kb image-2022-09-08-12-29-04
08/Sep/22 5:29 AM            34 kb image-2022-09-08-12-30-32
08/Sep/30 5:30 AM            32 kb

800 ⟶

Set slope threshold
    Threshold = 0.01

Set sample data n
    For i = 1 to n
        Read $Y_i$
        $X_i = i$
    Initialize:
    sumX = 0
    sumX2 = 0
    sumY = 0
    sumXY = 0

Calculate Required Sum
    For i = 1 to n:
        sumX = sumX + $X_i$
        sumX2 = sumX2 + $X_i * X_i$
        sumY = sunY + $Y_i$
        sumXY = sumXY + $X_i * Y_i$ Calculate Required Constant a and b of y = a + bx:
    b = (n * sumXY − sumX * sumY) / (n * sumX2 − sumX * sum X)
    a = (sumY − b * sumX) / n if b > threshold value
    flag positive trend

Set sample data n = 14

For i = 1 to n:
    Read $Y_i$

Compute moving average with current and two previous samples
    For i = 1 to n − 2:
    $SMA_i = (Y_{i+2} + Y_{i+1} + Y_i) / 3$ Use $SMA_1$ ... $SMA_{12}$ as input to a linear regression process

Set sample size data n = 17

Calculate weighted multiplier
 Weight = 2 / (6 + 1) = 2/7

For I = 1 to n:
 Read $Y_i$

Compute initial exponential moving average
 $EMA_1 = (Y_6 + Y_5 + Y_4 + Y_3 + Y_2 + Y_1) / 6$ Compute 6 period exponential moving average
 For i = 2 to n − 5:
  $EMA_i = Y_{i+5} * Weight + EMA_{i-1} * (1 - Weight)$ Use $EMA_1$ ... $EMA_{12}$ as input to a linear regression process/algorithm

FIG. 10

AUTOMATIC MEMORY LEAK DETECTION

BACKGROUND

Memory leak is currently a persistent and prevalent problem in all systems running complex software. Memory leaks can be difficult to find and can result in processes being killed and/or can lead to entire system unavailability. Currently, memory leaks can be identified using the output of process monitoring tools (e.g., programs that produce updated lists of running processes selected by user-specified criteria). These monitoring tools generally only examine user space processes; particularly the display of information related to computer processing unit (CPU) use and/or memory allocation and/or utilization. In order to isolate memory leaks, individuals (e.g., user identities such as system administrators) typically have had to manually identify key processes in order to obtain pertinent results. There are static analysis tools that can be used to check application code at build time. However, the static analysis tools can often fail to find runtime memory leaks during many error conditions and generally are not useful with regard to third-party binary libraries. There also are runtime tools to detect memory leaks for specific software components. However, these runtime tools directed at detecting memory leaks for specific software components do not generally cover all memory components, add too much overhead to the runtime code to be useful during quality assurance (QA) testing, and typically are not suitable to run at customer sites.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 8 illustrates an example pseudo code for implementing a linear regression analysis based on collected memory data, in accordance with various non-limiting example embodiments.

FIG. 9 illustrates an example pseudo code for implementing a time series simple moving average, in accordance with various non-limiting example embodiments.

FIG. 10 depicts an example pseudo code for implementing a time series exponential moving average, in accordance with various non-limiting example embodiments.

DETAILED DESCRIPTION

Figure 1:
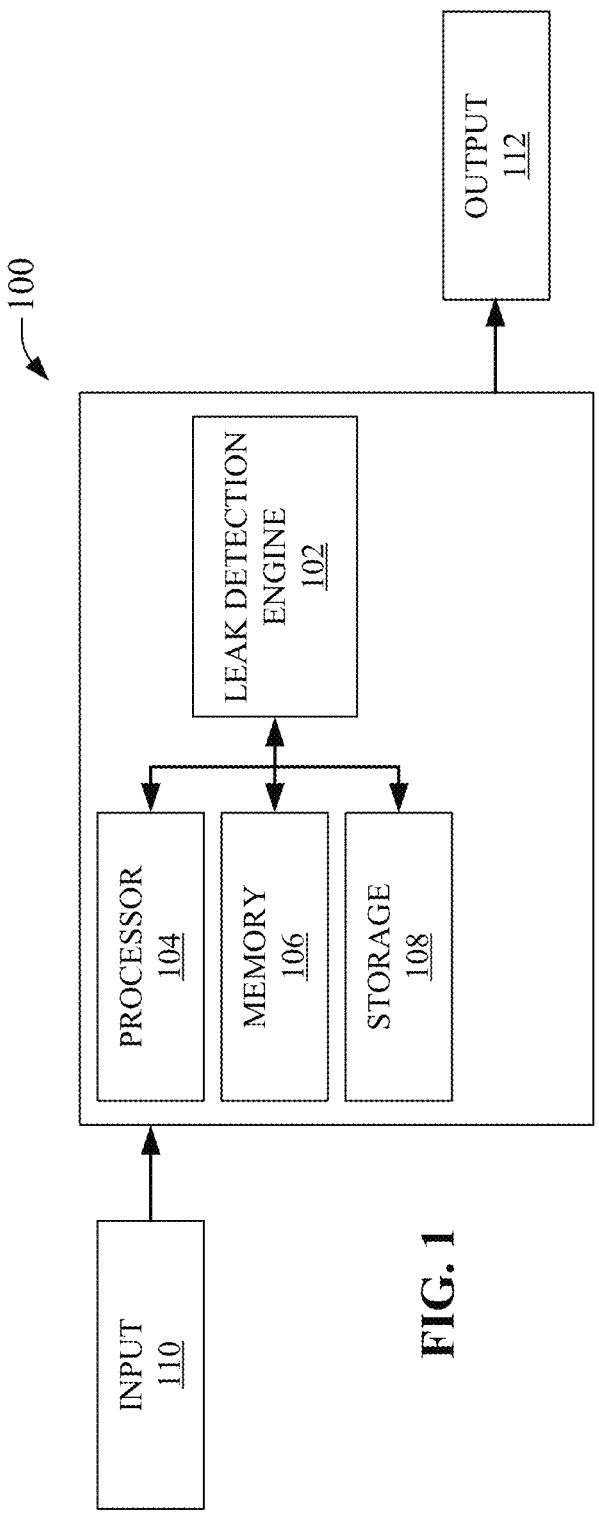
FIG. 1 illustrates a block diagram of a system for automatic memory leak detection, in accordance with various non-limiting example embodiments.

Embodiments of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The subject disclosure generally describes a mechanism, or system, that detects memory leaks and isolates the detected leaks to specific determinable memory components. The system has low overhead, can run continuously (e.g., from user identity initiated power up and/or CPU startup to user identity initiated CPU shutdown), and, in response to identifying and detecting memory leaks, can alert one or more user identities of the memory leaks.

Memory leaks are a type of resource leak that occurs when a computer program, in execution, mismanages memory allocations in such a way that memory which is no longer needed is not released. Memory leaks can also occur when an object is stored in memory but cannot be accessed by the running code (e.g., unreachable memory). A memory leak has symptoms similar to various other issues and typically can only be diagnosed by user identities, such as programmers and system administrators.

Memory leaks can reduce the performance of the computer by reducing the amount of available memory. Ultimately, should too much available memory be allocated, all or part of a functioning system or device will eventually start operating erratically, applications in execution fail, and/or the system slows down vastly due to thrashing (e.g., when a computer's virtual memory resources are overused, leading to a constant state of paging and page faults, inhibiting most application-level processing). Memory leaks may not be serious or even detectable for most executing processes that run for short durations of time, and/or where the majority of executing processes release their memory allocations when they terminate. More serious memory leaks can become evident and deleterious to overall system health and wellbeing, where programs execute over extended periods of time-consuming ever-increasing memory allocations over time. Programs that can execute over extended time horizons can include background tasks on server equipment, especially in embedded equipment that can comprise processing units, memories, and dedicated peripherals, typically, electrical and/or mechanical devices, such as actuators, instrumentation, and the like. Other sources of serious memory leaks can include instances where: software in execution requests ever increasing allocations of shared memory for one-time tasks such as rendering frames of computer games and/or animated video; the software in execution fails to release allocated shared memory when the executing software terminates; and where memory is very limited, such as in portable devices and/or embedded systems, and/or where a program in execution, on initialization requires a persistent large allocation of memory of an already curtailed and limited overall memory, leaving scant room for error.

The subject disclosure provides devices, systems, mechanisms, apparatuses, methods, and/or processes that detect memory leaks and isolate the detected leaks to specific determinable memory components. In general, the disclosed devices, systems, mechanisms, apparatuses, methods, and/or processes have low overhead and can execute continuously on the machinery, devices, systems, mechanisms, and apparatuses on which the disclosed subject matter is installed. Further, the disclosed subject matter is source language agnostic and can be used to provide automatic alerts/notifications concerning potential memory leaks.

In some embodiments the disclosed subject matter can collect memory usage data from one or more storage facilities, such as database equipment, at one or more defined or definable time intervals (e.g., every half hour, every hour, every six hours, every twelve hours, every twenty-four hours, and the like). These tunable time intervals can be defined or determined based, for instance, on use of one or more artificial intelligence process. Example artificial intelligence process can comprise using deep learning implementations, machine learning processes, and other similar neural network modeling capable of making data-driven decisions. In some implementations cost-benefit analyses can be used to determine appropriate tunable time intervals. For example, in some embodiments a decision to set a time interval can be based on the benefit of setting a first time interval outweighing the cost of setting the first time interval. In other embodiments a decision to set time intervals can be ascertained as a function of multi-objective maximization and/or multi-objective minimization determinations (e.g., Pareto optimization).

The disclosed systems and methods, in accordance with various embodiments, provide a system, apparatus, or device comprising: a processor; and a memory that stores executable instructions that, when executed by the processor, facilitate performance of operations. The operations can comprise: collecting, to a data slot of a defined data structure, a flow of memory usage data received from a resource monitoring process executing on the system, in response to determining a time value exceeding a defined threshold time value, closing the data slot, based on the memory usage data included in the data slot, executing a trend analysis process using the memory usage data as an input to the trend analysis process, and in response to the trend analysis process determining a trend associated with the memory usage data, transmitting notification data representing the trend to a user equipment.

In regard to the foregoing, the data slot can be a first data slot, and wherein the operations can further comprise, in response to closing the first data slot, opening a second data slot associated with the defined data structure and directing the flow of memory usage data to the second data slot.

Other operations can comprise: in response to determining the trend in the memory usage data, generating, based on the use of an artificial intelligence process, recommendation data, wherein the recommendation data can be transmitted to the user equipment, and in response to determining that the collecting of memory usage data is an initial collecting of memory usage data after the system commenced operation, initializing the defined data structure.

Additional operations can comprise: in response to determining that the collecting of memory data is an initial collecting of memory usage data subsequent to the system becoming functional after a supply of electrical power to the system, resetting a clock associated with the data structure, the determining that the collecting of memory data is the initial collecting of memory usage data is determined as a function of a clock that was initiated at the supply of electrical power to the system, wherein the clock can have been initiated with a defined value determined based on prior data representative of prior startup events associated with the system and when the system achieved an equilibrium state, and wherein the equilibrium state is a state in which the system does not experience memory usage variations that exceed an upper variation threshold value and/or fall below a lower variation threshold value.

Concerning the above, a data slot can be associated with a count-down clock, and a defined data structure can comprise a defined group of data slots. Further, the determining that the time value exceeds the defined threshold value can be measured using a system clock associated with the data slot.

In accordance with further embodiments, the subject disclosure describes a method, comprising a series of acts that can include: in response to an initiation request received from a user equipment, instantiating a defined data structure comprising a group of data slots, directing to a data slot of the group of data slots, a flow of memory usage data received from a resource monitoring process executing on the system, in response to determining a time value exceeding a defined threshold time value, closing the data slot, based on the memory usage data included in the data slot, executing a trend analysis process using the memory usage data as an input to the trend analysis process, and in response to the trend analysis process determining an upward trend associated with the memory usage data, transmitting notification data representing the upward trend to a user equipment.

Further acts can include: wherein when the data slot is a first data slot of the group of data slots, and in response to the time value exceeding the defined threshold time value, sending the flow of memory usage data to a second data slot of the group of data slots, wherein when the group of data slots has a defined number of data slots, wherein in response to determining that a newest data slot of the group of data slots to be open for access exceeds the defined number of data slots, sending the memory usage data included in an oldest data slot of the group of data slots to data storage equipment, and in response to transmitting the notification data to the user equipment, sending the memory usage data used to perform the trend analysis process to archival storage equipment. Other example acts can comprise wherein when the memory usage data included in the data slot is first memory usage data included in a first data slot, performing the trend analysis process using the first memory usage data and second memory usage data included in a second data slot of the group of data slots.

With regard to the foregoing, the defined data structure can be a queue and the grouping of data slots can represent queue slots.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: receiving, into a data slot of a defined data structure, a flow of memory usage data sent by a resource monitoring process operational on the system, in response to determining a time value exceeding a defined threshold time value, closing the data slot, based on the memory usage data included in the data slot, executing a trend analysis process using the memory usage data as an input to the trend analysis process, and in response to the trend analysis process determining a trend associated with the memory usage data, transmitting notification data representing the trend and recommendation data representing a suggestion to reverse the trend to a user equipment.

In regard to the foregoing, when the memory usage data is first memory usage data, the data slot is a first data slot, the operations can comprise generating the recommendation data using a machine learning process, wherein the first memory usage data and second memory usage data included in a second data slot serve as input to the machine learning process, and wherein the second memory usage data included in the second data slot comprises an earlier representation of memory usage data.

Moreover, concerning the foregoing, the defined data structure can be a linked list of a defined linked list length and the data slot can be a data storage object attached to a head end of the linked list.

Now in reference to the Figures, FIG. 1 depicts a system 100 for automatic memory leak identification and/or detection, in accordance with various example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise leak detection engine 102 that can be in operative communication with processor 104, memory 106, and storage 108. Leak detection engine 102 can be in communication with processor 104 for facilitating operation of computer-executable instructions or machine-executable instructions and/or components by leak detection engine 102, memory 106 for storing data and/or computer-executable instructions and/or machine-executable instructions and/or components, and storage 108 for providing longer term storage of data and/or machine-readable instructions and/or computer-readable instructions. Additionally, system 100 can also receive input 110 for use, manipulation, and/or transformation by leak detection engine 102 to produce one or more useful, concrete, and tangible result, and/or transform one or more articles to different states or things. Further, system 100 can also generate and output the useful, concrete, and tangible results and/or the transformed one or more articles as output 112.

System 100 in conjunction with leak detection engine 102 can receive, as input 110, a directive to execute code instructions, included in a system startup file, to initiate leak detection engine 102. The directive can be received, for example, from user equipment associated with a user identity, wherein the user identity can be affiliated with a corporate entity that owns, for instance, server equipment and/or storage equipment on which leak detection engine 102 is to become operational. The system startup file, in many implementations, can be part of embedded software associated, for instance, with firmware used to provide runtime services for operating systems and programs, and to perform hardware initialization during power-on startup. In some alternate implementations and/or embodiments, rather than receiving a directive from user equipment associated with one or more user identities, leak detection engine 102 can be instantiated as a virtual machine (VM) that becomes operational in response to system 100 being supplied with electrical power.

Leak detection engine 102 in response to becoming operational and/or in response to being instantiated can create one or more data structure needed to facilitate its goal-monitoring, detecting, and/or identifying memory leaks associated with memory allocated to a plenitude of disparate processes and/or processing threads that can be operational on system 100 at any instance of time. For instance, in some implementations the data structures can be one or more queues. In other implementations the data structures, for instance, can be stacks, linked lists, pointer-based data structures, and the like.

Leak detection engine 102, in near contemporaneity with establishing the one or more data structures needed to facilitate its aims, can also initiate one or more timers or system clocks, wherein each of the one or more timers or system clocks can be associated with each of the one or more data structures. For example, where a first data structure, for example a first queue, is created with a defined number of queue slots, a first timer or system clock can be associated with the first data structure. In regard to the subject disclosure, a group of data structures can be created. For instance, a first data structure can be representative of an hourly data structure, a second data structure can be created and can represent a six hour data structure, a third created data structure can be representative of a twelve hour data structure, and a fourth data structure can be instantiated and can be representative of a twenty four hour data structure. To each of the first, second, third, and fourth instantiated data structure a respective first, second, third, and fourth clock can be initiated and associated with the respective first, second, third, and fourth instantiated data structure. Thus, for example, a first clock that measures time in intervals of one hour can be associated with the hourly data structure, a second clock that measures time in six hour intervals can be associated with the six hour data structure, a third clock that gauges time in twelve hour intervals can be associated with the twelve hour data structure, and a fourth clock that assesses time in periods of twenty-four hours can be associated with the twenty-four hour data structure. In regard to the time intervals (e.g., one hour, six hours, twelve hours, and twenty-four hours) these interval are being used entirely for purposes of exposition of the disclosed subject matter rather than limitation. Thus, other periods of time would fall squarely within the ambit of the subject disclosure. Similarly, concerning the number of data structures created and associated with respective time intervals, while four data structures have been elucidated, it is within the contemplation of the inventor that more data structures or fewer data structures associated with appropriate time intervals can be used without departing from the described functionalities and/or facilities expounded upon, and set forth, in the subject disclosure.

Concerning the timers and system clocks, in some embodiments, the timers or system clocks can be generic count-down clocks, wherein a count-down clock, on being initiated, can be set to expire after a defined or definable time period (or a predetermined or determinable threshold time period) has been reached. For example, a count-down clock can be set to expire after sixty minutes, whereupon after the fifty-ninth minute has been reached the count-down clock will notify, for instance, an initiating process that the count-down clock has expired. In other embodiments, the system clocks or timers can be generic count-up timers, wherein a count-up timer, in response to being initiated, expires when a threshold time period has been attained. For instance, a count-up clock can be set to notify, after the effluxion of fifty-nine minutes, an initiating thread that the count-up clock has reached sixty minutes.

In regard to the aforementioned generic count-down clocks and/or generic count-up clocks, in some embodiments, the count-down clocks and/or count-up clocks can be bespoke clock instantiations specifically configured to be associated with one or more of the created data structures. In other embodiments, the count-down and/or the count-up clocks can be clocks associated with other processors (e.g., processing units that exploit quantum mechanical phenomena, graphic processing units, arithmetic processing units, artificial intelligence neural networking processing units, processors associated with IoT equipment, processors associated with global positioning satellite (GPS) equipment/global navigation satellite system (GNSS) equipment, etc.), functionalities, and/or facilities associated with, and/or included with, system 100.

Leak detection engine 102, in response to a defined time period, as determined by a clock (e.g., count-down clock and/or count-up clock) associated with one or more of the created data structures, having expired, wherein the defined time period can be representative of an initial time period subsequent to leak detection engine 102 having been initiated as a executing process, and/or a multi-threaded process, operational on system 100, and/or instantiated, for example, as a virtual machine operating on system 100, can cause all data that can have been persisted to, and/or accumulated in, the respective one or more data structures to be flushed and/or discarded. The rationale for discarding any data accumulated in the one or more data structures between system startup and the expiration of the initial time period (e.g., the first five to ten minutes after the system has been powered up) can be due to the fact that in general, on initial startup of typical computer systems, memory usage can vacillate between extremes, spiking and toughing for moments in time, being abnormally high and exceeding a normal running steady state threshold at a first instance of time and being uncommonly low in relation to the normal running steady state threshold at a second instance in time. Once the system (e.g., system 100) has attained, and is maintaining, a steady state, most data accrued or persisted to the one or more created data structure, for the purposes set forth in this disclosure, can be better used to highlight occurrences of anomalous memory aberrations once the system has reached a steady state, where inexplicable, persistent, and/or accumulative memory usage outflows (and/or memory misallocations) without commensurate replenishment can be representative of serious impediments to maintaining the achieved steady state, and the continued efficient operation of the system.

Once leak detection engine 102 has flushed the one or more established data structures, simultaneously or in near contemporaneity with the flushing of the one or more established data structures, respective clocks associated with each of the established data structures can be reset and data representing a first sample dataset can be collected. For instance, where a one-hour data structure has been established to collect data for a one hour period, the clock associated with the one hour data structure can be initialized to expire after the elapse of one hour (e.g., fifty-nine minutes). Further, the first sample dataset can comprise memory utilization data associated, for example, with available memory data (e.g., memory available for user space processes), proportional set size (PSS) data individuated for every process (e.g., resident memory of each process), anonymous page data (e.g., dynamically allocated non-file pages), page cache data (e.g., memory used for file caching), slab data (e.g., operating system kernel caching), and kernel module data (e.g., memory allocated by the operating system kernel modules in the kernel space). The sample datasets associated with the other data structures can accrue similar memory utilization data. Further, the memory data (or resource data) can be collected from one or more files that can be used to implement the native resource monitoring facilities and/or functionalities associated with the operating system executing on system 100.

Figure 5:
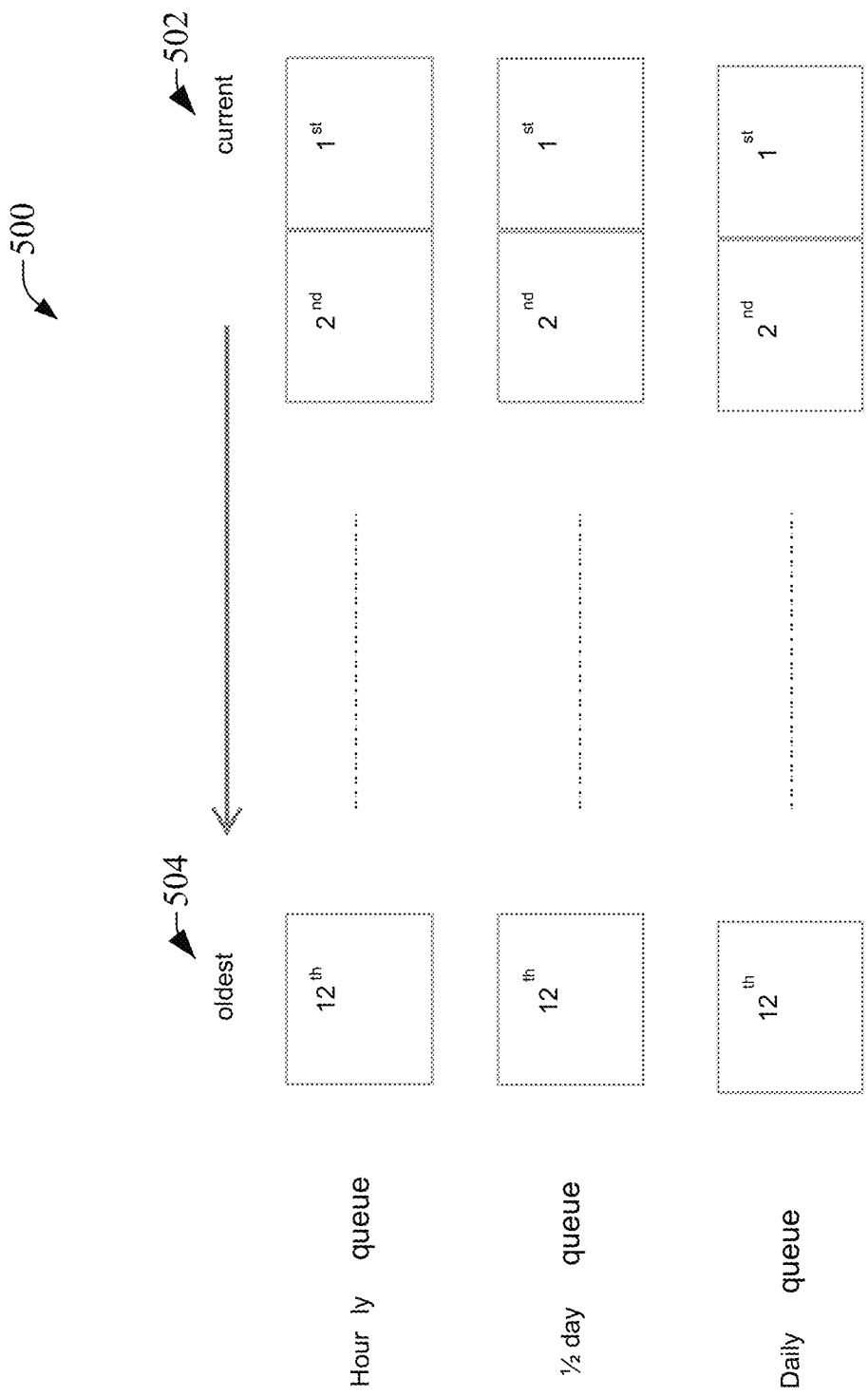
FIG. 5 depicts example data structures that can be employed for automatic memory leak monitoring, detection and notification, in accordance with various non-limiting example embodiments.
Figure 6A:
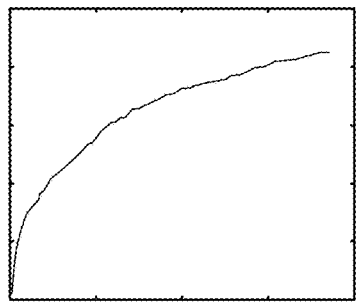
FIGS. 6A, 6B, 6C, 6D, 6E, 6F, 6G, and 6H depict a collection of respective example plots pertaining to proportional set size (PSS) trends associated with memory leak detection, in accordance with various non-limiting example embodiments.
Figure 6B:
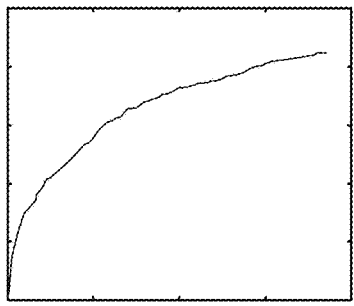
Figure 6C:
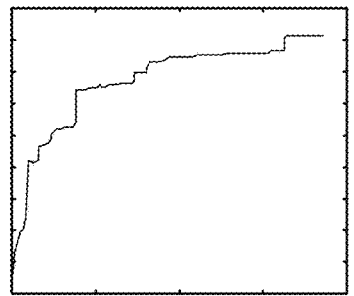
Figure 6D:
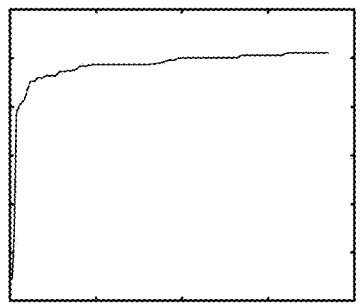
Figure 6E:
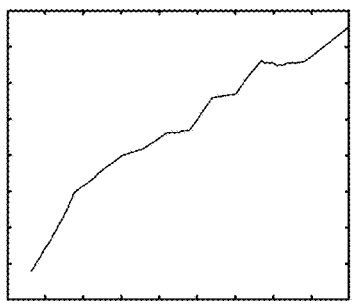
Figure 6F:
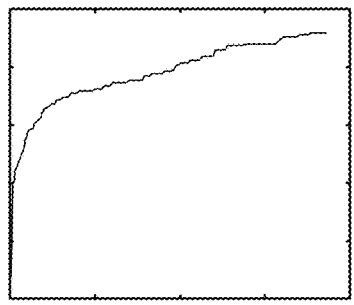
Figure 6G:
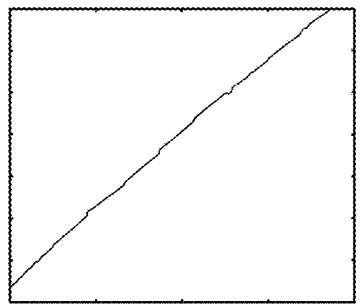
Figure 6H:
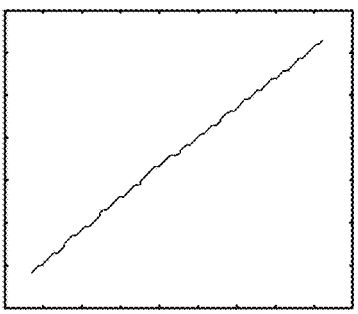

In regard to the subject disclosure, solely for purposes of elucidation, it will be observed in reference to FIG. 5 that three data structures (e.g., queues) can have been instantiated. FIG. 5 illustrates the three data structures 500 (e.g., an hourly queue, a ½ day queue, and a daily queue). Each of the data structures can comprise a respective head end (e.g., 502) and a respective tail end (e.g., 504). In this instance the head end of each respective queue can comprise the most recently acquired sample data (e.g., current dataset), and the tail end of each respective queue can comprise the oldest acquired sample data (e.g., oldest dataset). It will also be noted in relation to FIG. 5 that each of the data structures 500 can have been established with twelve queue slots. Thus, in regard to the hourly queue each slot can be representative of data accumulated and sampled during each hour. In regard to the ½ day queue each queue slot can represent a time duration of twelve hours and as such the ½ day queue can capture one hundred and forty-four hours of sample data (e.g., since there are twelve slots each comprising twelve hours of sample data). In relation to the daily queue, each queue slot captures one day's worth (e.g., twenty-four hours) of sample data, and as such the twelve queue slots would capture twelve days (e.g., two-hundred and eighty-eight hours) worth of sample data. In this example, with reference, for instance, to the hourly queue, after the capture and en-queuing of a thirteenth hour of data (now the most current sample data capture) at the head end (e.g., 502), the oldest hour of data can be de-queued from the tail end of the hourly queue (e.g., 504). Similar processes can be implemented in the context of the other queues; in response to capturing the thirteenth tranche of sample data, the tail end of the queue (e.g., the oldest captured sample dataset) can be discarded from the queue structure and persisted, for example, to storage (e.g., database equipment) for long term archival, the queue structure can be reorganized by shuffling the now eleven previously queued sampled datasets down one respective queue slot toward the tail end (e.g., 504), and placing the most recent sampled data (e.g., the thirteenth tranche of sample data) at the head end (e.g., 502) of the queue. The foregoing reorganization of the queue structure can be termed as rolling data collection.

In regard to the queue slots allocated for each queue structure, in some implementations of the subject disclosure, a fewer number of queue slots and/or a greater number of queue slots can be allocated for each respective queue structure. The number of queue slots to be allocated with each respective queue structure, in some embodiments, can be based, for example, on the linear regression process implementation selected for use in order to perform trend analysis and to identify trends associated with the sampled data sets.

Leak detection engine 102, in response to a timer or clock associated with one or more of the data structures expiring, can cease funneling data samples into the dataset currently earmarked for the current slot, and in the process can close the dataset, place the dataset at the head of the data structure, open a new sampling dataset to capture new data samples representing a new current reality associated with the operational system 100, and reset or reinitialize the respective timer or clock associated with the one or more data structures. Thereafter, leak detection engine 102 can initiate a linear regression process to identify various trends that can have occurred during the timeframe associated with the one or more data structures. For instance, with regard to the hourly data structure, leak detection engine 102 can perform trend analysis on the dataset that has been placed at the head of the data structure. Illustrative pseudo-code pertinent to performing the trend analysis is depicted in FIGS. 8-10. Through implementation, execution, and use of the depicted pseudo-code, in conjunction with the dataset placed at the head end of the data structure, determinations can be made as to whether any rising (e.g., upward) trends in relation to memory usage can be identified.

In regard to the performance of the linear regressions and trend analyses set forth herein, leak detection engine 102 can use differing sample data from differing data structures. For instance, leak detection engine 102, in accordance with some embodiments, can use a first dataset en-queued in the tenth slot of the ½ day queue in association with a second dataset en-queued in the second slot of the hourly queue to perform the linear regressions and trend analyses.

Leak detection engine 102, in response to identifying an upward trend in relation to memory usage, can generate alert notifications noting that an upward trend has been identified in relation to memory usage. In addition, leak detection engine 102, based on one or more datasets that can have previously been persisted to long term storage, for example, and learning model data representing one or more artificial intelligence paradigm, machine learning model, neural network model, big data/data mining analytic model, and the like, can synthesize recommended courses of action to ameliorate and/or rectify the noted upward trend in excessive memory usage. For instance, leak detection engine 102 can generate recommendations and suggested courses of action based, at least in part, on one or more rules. The rules can be based on cost to benefit analyses, machine learning paradigms, and/or neural network processes. In regard to the use of cost to benefit analyses, based on groups of previously identified and determined rules, the costs associated with adopting a particular course of action can be compared with the benefits associated with adopting the particular course of action; wherein when the benefits of adopting the action outweigh, even marginally, the costs associated with adopting the course of action, the action can be pursued. Further, in some implementations, artificial intelligence technologies, neural networking architectures, collaborative filtering processes, machine learning techniques, Bayesian belief systems, big data mining and data analytic facilities, and the like, can be employed, wherein for example, multi-objective optimization (e.g., Pareto optimization) can be used to determine whether or not an action or a series or group of actions should be initiated and/or implemented. Multi-objective optimization can ensure that first actions or groups of first actions can only be implemented provided that other second actions or groups of other second actions will not be detrimentally affected.

At this stage, leak detection engine 102 can associate the recommendation data that can have been identified by means of artificial intelligence technologies, neural networking architectures, collaborative filtering processes, machine learning techniques, Bayesian belief systems, and/or big data mining and data analytic functionalities, with notification data that can have been the result of trend analysis, based on employing one or more linear regression tool, identifying a rising (e.g., upward) trend in relation to possible memory misallocations and/or oversubscribed memory usage. The combination of the recommendation data and the notification data can be transmitted, as a package bundle, to user equipment associated with a user identity affiliated with a corporate entity with a controlling interest in system 100 (and/or various other infrastructures that can facilitate operation of system 100). The user identity can then formulate an action plan, based, for example, on the recommendation data and the notification data to counter the rising trends related to undetermined or currently undeterminable memory misallocations and/or unexplainable and/or rampant continuous memory usage.

Figure 2:
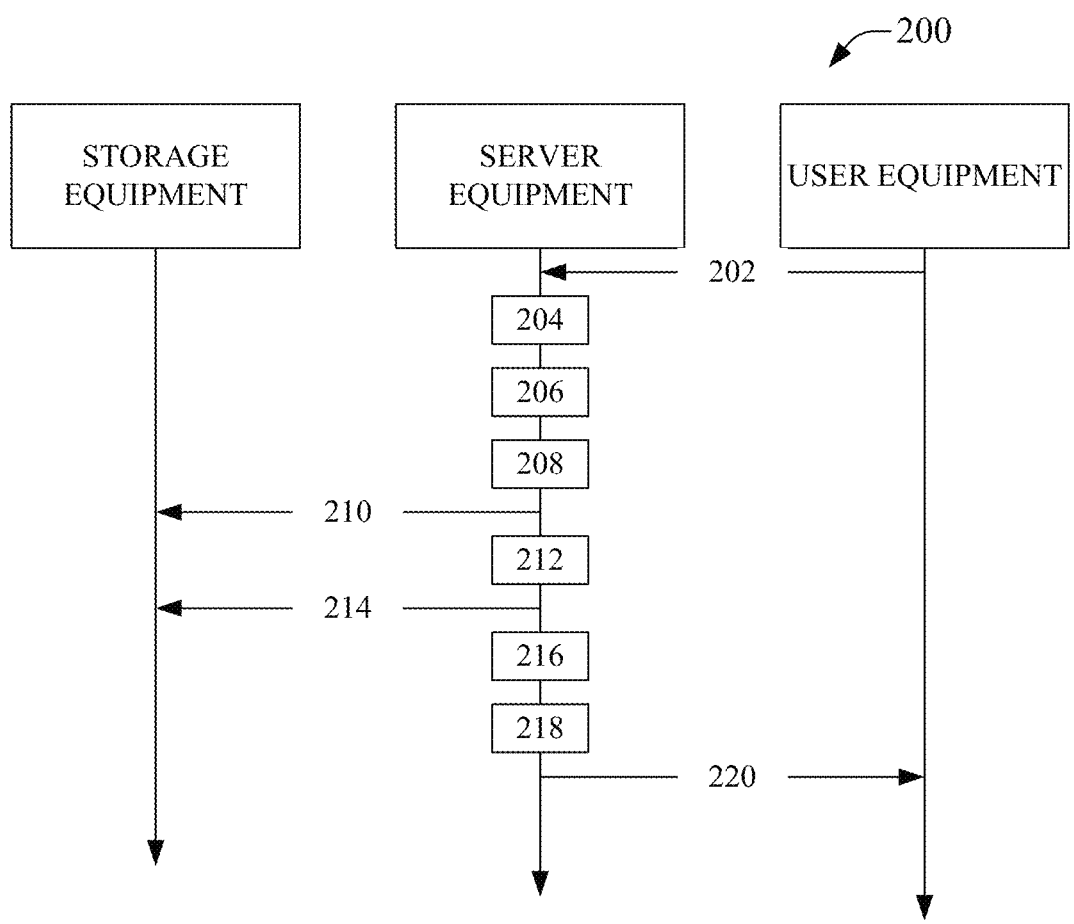
FIG. 2 depicts a method, process, or time sequence chart for automatic memory leak detection and notification, in accordance with various non-limiting example embodiments.
Figure 3:
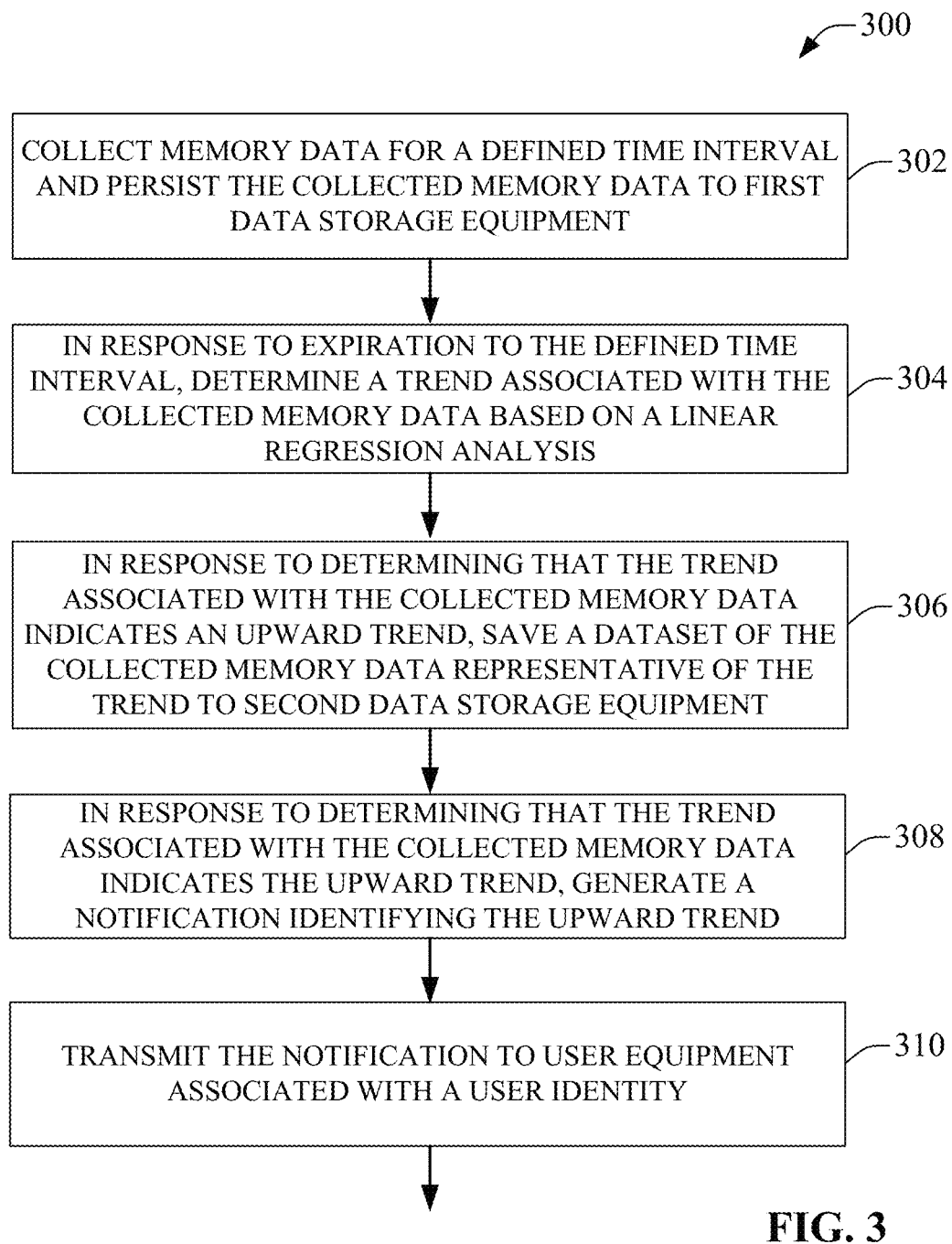
FIG. 3 illustrates a method, process, flow chart, or time sequence chart for automatic memory leak monitoring, detection and notification, in accordance with various non-limiting example embodiments.
Figure 4:
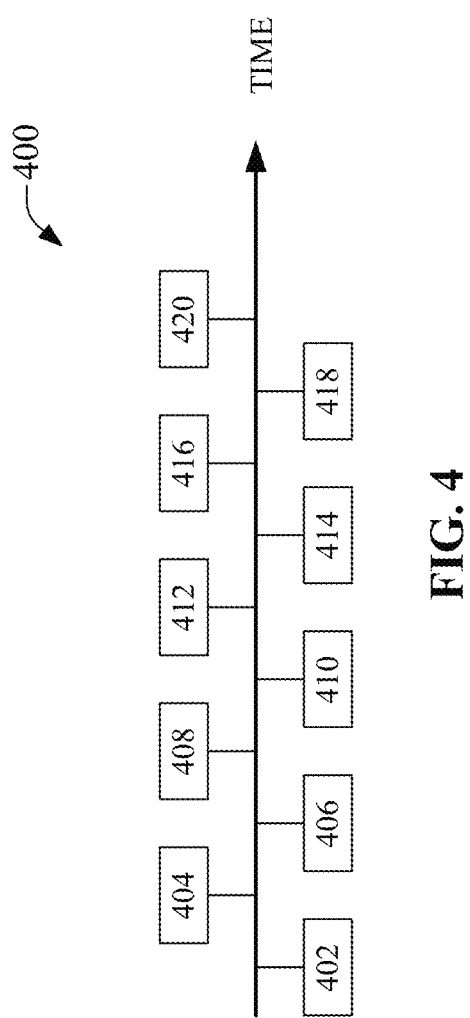
FIG. 4 illustrates yet a further method, process, flow chart, or time sequence chart for monitoring and automatically detecting, and notifying a user identity of memory leaks, in accordance with various non-limiting example embodiments.

FIGS. 2-4 illustrate flowcharts, time sequence charts, and/or methodologies for performing operations corresponding to system 100, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 2 provides illustration of a time sequence chart or flow diagram 200 for automatic memory leak identification and/or detection, in accordance with various example embodiments. Time sequence chart 200 can start at act 202 where user equipment can be used to initiate system 100 and/or instantiate leak detection engine 102, for example as an executing multithreaded process. In some implementations leak detection engine 102 can an instantiation of a virtual machine that becomes operational in response to system 100 becoming functional when electrical power is supplied to it.

At act 204, leak detection engine 102 can initiate a grouping of clocks and/or timers that can be used in conjunction with one or more data structures that leak detection engine 102 can create at act 206. In regard to initiating a grouping of clocks and/or timers at act 204 and creating the one or more data structures at act 206, these acts can be performed simultaneously or in near contemporaneity with one another. At act 208, leak detection engine 102 can commence collecting memory data into the created data structures and at the same time can also start the grouping of clocks and/or timers. As has been noted earlier, the collected memory data can comprise, without limitation, available memory data (e.g., memory available for user space processes), proportional set size (PSS) data individuated for every process (e.g., resident memory of each process), anonymous page data (e.g., dynamically allocated non-file pages), page cache data (e.g., memory used for file caching), slab data (e.g., operating system kernel caching), and kernel module data (e.g., memory allocated by the operating system kernel modules in the kernel space), for instance. As will be appreciated by those of ordinary skill other data metrics, for instance, processor metrics, can also be collected and analyzed in the same manner as set forth in this disclosure.

At act 210, leak detection engine 102 can determine whether or not an initial time period (e.g., three to five minutes) determined from when system 100 has been started has expired. Determining whether or not a time period has expired can be determined as a function of a measured time value exceeding a threshold value (e.g., count-up timing), or as a function of the measured time value becoming zero (e.g., count-down timing). In response to determining that the initial period has elapsed, leak detection engine 102 can flush all data collected into the data structures that had been created at act 208. As noted earlier, the initial flushing of the created data structures is to ensure that the rampant early memory (or other computer resource) vacillations associated with system startup do not unduly influence subsequent determinations made by leak detection engine 102. At this point in time and at act 210 leak detection engine 102 can flush the data contained in the data structures to storage equipment (e.g., for short or longer term storage, and/or for purposes other analyses determination). It should be noted that in some embodiments an implementation decision can be made not to persist this nascent sampling of memory data, in which case the data can be flushed entirely from the system. Also at act 210 at the same time as flushing and/or reinitializing the created data structures, the one or more clocks and timers associated with the created data structures can be reset or restarted.

At act 212, leak detection engine 102 can commence collecting memory data into the created data structure and monitoring the various clocks associated with the respective created data structure. As has been noted earlier each of the respective data structures and timer/clock pairing can pertain to disparate time windows. For instance, a data structure comprising N slots, wherein each of the N respective slots represents a defined window associated with a defined time period value (e.g., hourly time window, half-day time window, twenty-four hour time window, and the like) can be assigned to a timer/clock that measure time in periods (or intervals) of one hour, twelve hours, and twenty-four hours, etc. It should be noted that the value of N can typically be a non-negative integer, generally greater than zero. At act 212, in response to the end of a slot period (e.g., one hour, twelve hours, twenty-four hours, and the like), leak detection engine 102 can close the slot to further collection of new data, open another slot for the collection of the new data, cause the new data to start flow into the new slot, and restart the clock associated with the data structure for which the slot has been closed. For instance, consider the case of a one hour data structure, wherein in response to the elapse of a one hour time period, leak detection engine 102 can (a) open a second slot in the data structure, (b) cause the flow of memory data to be directed from a first slot to the opened second slot, (c) appropriately close the first slot (e.g., with one or more terminating characters, check sums, verification codes, etc.), and (d) restart the clock associated with the one hour data structure.

At act 214, the data collected in the now first slot can then be sent for long term storage (or archival) to storage equipment. At act 216, the memory data included in the first slot can be analyzed to detect for any trends concerning memory usage. The detection of trends in relation to memory usage can be facilitated by using one or more linear regression processes. Example linear regression pseudo code is presented in FIGS. 8-10.

In regard to FIG. 8 this pseudo code 800 is illustrative of a simple linear regression pseudo-code. Concerning FIG. 9, this pseudo code 900 presents an illustrative time series simple moving average pseudo code that can be used together with the simple linear regression pseudo code 800 depicted in FIG. 8. Concerning pseudo code 900, it should be observed that the sample periods have been increased to fourteen and that three periods have been used to provide the moving average. Accordingly, suitable adjustments would need to be made to the slot numbers associated with the respective data structures. It should also be noted in the context of pseudo code 900 that the sample periods and the moving average periods used to implement the moving average are solely illustrative, and fewer or greater sample periods and/or moving average periods can be used with equal facility and functionality without departing for the scope of the subject disclosure. In the context of FIG. 10 an additional and/or alternative pseudo code 1000 is depicted. Pseudo code 1000 can also be used in conjunction with, or as an alternative to, pseudo code 900. FIG. 10 provides an illustrative pseudo code 1000 for determining a time series exponential moving average, wherein the sample periods have been increased to seventeen and that six periods have been used to provide the moving average. Accordingly, the respective data structures elucidated herein may require modification to implement the time series exponential moving average pseudo code 1000. Once again, as noted in regard to FIG. 9, the values associated with the sample periods and the moving average periods can vary without necessarily departing from the ambit of this disclosure.

Returning to FIG. 2, at act 218, based on applying the linear regression pseudo code 800, and/or the time series simple moving average pseudo code 900, and/or the time series exponential moving average pseudo code 1000, and in response to identifying a trend (e.g., upward) associated with the analyzed memory data, leak detection engine 102 can generate notification data providing indication to an user identity that an upward trend in memory usage has been identified, and recommendation data that can provide solutions and/or recommendations/suggestions that the user identity can use to identify and/or ameliorate the underlying memory misallocations and anomalous memory over usage. The recommendation data can be based on the one or more artificial intelligence paradigms enunciated above, such as big datasets, data mining, machine learning, etc.

At act 220, leak engine 102 can transmit the bundled notification data and the recommendation data to user equipment for action by a user identity associated with a corporate entity that can control and/or monitor server equipment on which leak engine 102 is operational.

FIG. 3 depicts a flow diagram 300 for automatic memory leak monitoring, identification, and/or detection, in accordance with various detailed implementations and/or described embodiments. At act 302, system 100 (e.g., leak detection engine 102) can collect memory data for a defined time interval/period. Leak detection engine 102 can direct the incoming memory data into a first data structure slot of a collection of data structure slots associated with an instantiated data structure comprising the collection of data structure slots (e.g., queue slots). The created data structure and associated collection of data structure slots can be maintained in short term memory (e.g., memory 106) and/or storage (e.g., storage 108), and stored to first data storage equipment associated with system 100. Further, the created data structure can be instantiated with an association with a timing facility, such as one or more system clock.

At act 304, leak detection engine 102, in response to determining that the defined time interval/period, as measured by the timing facility, has expired, can direct the incoming memory data to an opened second data structure slot of the collection of data structure slots, thereby appropriately closing the first data structure slot and resetting the timing facility associated with the data structure. Also, at act 304, leak detection engine 102 can perform a linear regression analysis on the memory data included in the first data structure slot in order to determine one or more trends associated with the memory data. It should be observed that while leak detection engine 102 is mainly concerned with analyzing trends in relation to memory data included in the first data structure slot, earlier memory data include in previous data structure slots that can have been collected and persisted at earlier time intervals to long term archive on storage 108, can also be used in conjunction with the memory data included in the first data structure slot for the purposes of trend analysis.

At act 306, leak detection engine 102, can determine, based at least upon the linear regression analysis performed at act 304, that there is a trend associated with the memory data included in the first data structure slot. Thus, at act 306, in response to identify the trend, leak detection engine 102 can save, as a dataset representative of the trend identified and comprising the memory data that triggered leak detection engine 102 to perform the linear regression and trend analysis, the memory data to longer term storage (e.g., storage 108 and/or second data storage equipment in operational communication with system 100).

At act 308, leak detection engine 102, in response to determining that the trend associated with the memory data indicates an upward trend, can generate notification data representing a notification to a user identity associated with a corporate entity that owns, maintains, and/or controls the computing infrastructure to which system 100 is affiliated. Additionally, at act 308 leak detection engine 102, based at least in part of the memory data included in the dataset representative of the trend identified as triggering leak detection engine 102 to perform the linear regression and trend analysis, can generate recommendation data comprising one or more recommendation and/or suggestion for the user entity to use to rectify the upward trend in memory usage.

At act 310, leak detection engine 102 can transmit the notification data and the recommendation data to user equipment associated with the user identity.

FIG. 4 represents a time sequence or flow diagram 400 for automatic memory leak monitoring, identification, detection, and/or notification, in accordance with various detailed implementations and/or described embodiments. Time sequence 400 can commence at act 402 wherein a directive can be received from user equipment to initiate system 100 and/or instantiate leak detection engine 102. Once system 100 and/or leak detection engine 102 is operational, at act 404 leak detection engine 102 can instantiate a grouping of clocks and/or timers that can be used in conjunction with one or more data structures that leak detection engine 102 can create at act 406. As stated above, the instantiating of the grouping of clocks and/or timers at act 404 and the creation and association of the one or more data structures with the grouping of clocks and/or timers at act 406, can be performed simultaneously or in near contemporaneity with one another. At act 408, leak detection engine 102 can commence directing and/or collecting memory data into the created data structures and at the same time can also facilitate operation of the grouping of clocks and/or timers.

At act 410, leak detection engine 102 can determine whether or not an initial time period (e.g., three to five minutes) determined from when system 100 has been started has elapsed. Determining whether or not a time period has expired can be determined as a function of a measured time value exceeding a threshold value (e.g., count-up timing), or as a function of the measured time value becoming zero (e.g., count-down timing). In response determining that the initial period has elapsed, leak detection engine 102 can flush all data collected into the data structures that had been created at act 408. The initial flushing of the created data structures is to ensure that any wild vacillations in the memory usage at system startup do not unduly influence subsequent determinations made by leak detection engine 102. At act 410, leak detection engine 102 can flush the data contained in the data structures to storage equipment. It should be noted that in various embodiments decisions can be made not to persist this nascent sampling of memory data, in which case the data can be flushed entirely from the system. Also, at act 410, at the same time as flushing and/or reinitializing the created data structures, the one or more clocks and timers associated with the created data structures can be restarted.

At act 412, leak detection engine 102 can commence collecting memory data into the created data structure and monitoring the various clocks associated with the respective created data structure. Each of the respective data structures and timer/clock pairing can pertain to disparate time windows. For instance, a data structure comprising N slots, wherein each of the N respective slots can represent a defined time window associated with a determined period of time can be assigned to a timer/clock that measures time in defined time intervals (e.g., one hour, twelve hours, and twenty-four hours, etc.). At act 412, in response to the end of a slot period being determined leak detection engine 102 can gracefully close the slot to further collection of data, open another slot for the collection of the new data, cause the new data to flow into the new slot, and reinitialize the clock associated with the data structure for which the previous slot has been closed.

At act 414, the data collected in the first slot can then be sent for long term storage (or archival) to storage equipment. At act 416, the memory data included in the first slot can be analyzed to detect for any trends concerning memory usage. The detection of trends in relation to memory usage can be facilitated by using one or more linear regression processes.

At act 418, for example, based on applying the linear regression pseudo code 800, and/or the time series simple moving average pseudo code 900, and/or the time series exponential moving average pseudo code 1000, and in response to identifying a trend associated with the analyzed memory data, leak detection engine 102 can generate notification data providing indication to a user identity that a trend in memory usage has been identified, and recommendation data that can provide solutions and/or recommendations/suggestions that the user identity can use to identify and/or counter the identified trend. The recommendation data can be based on the one or more artificial intelligence paradigms enunciated above, such as, the use of big datasets, data mining, machine learning, etc.

At act 420, leak engine 102 can transmit the generated notification data and the generated recommendation data to user equipment for action by a user identity associated with a corporate entity that can control and/or monitor server equipment on which leak engine 102 is operational.

FIGS. 6A, 6B, 6C, 6D, 6E, 6F, 6G, and 6H provide respective illustrations of generated plots 600 including trend line slops identifying memory leaks in accordance with some example embodiments. The generated plots 600 represented in FIGS. 6A, 6B, 6C, 6D, 6E, 6F, 6G, and 6H were obtained during an equipment endurance test, where leak detection engine 102 was executed. Memory detection engine 102 reported memory leaks for eight processes (see FIGS. 6A, 6B, 6C, 6D, 6E, 6F, 6G, and 6H). Leak detection engine 102 generated the plots inclusive of the trend lines depicted in FIGS. 6A, 6B, 6C, 6D, 6E, 6F, 6G, and 6H.

Figure 7:
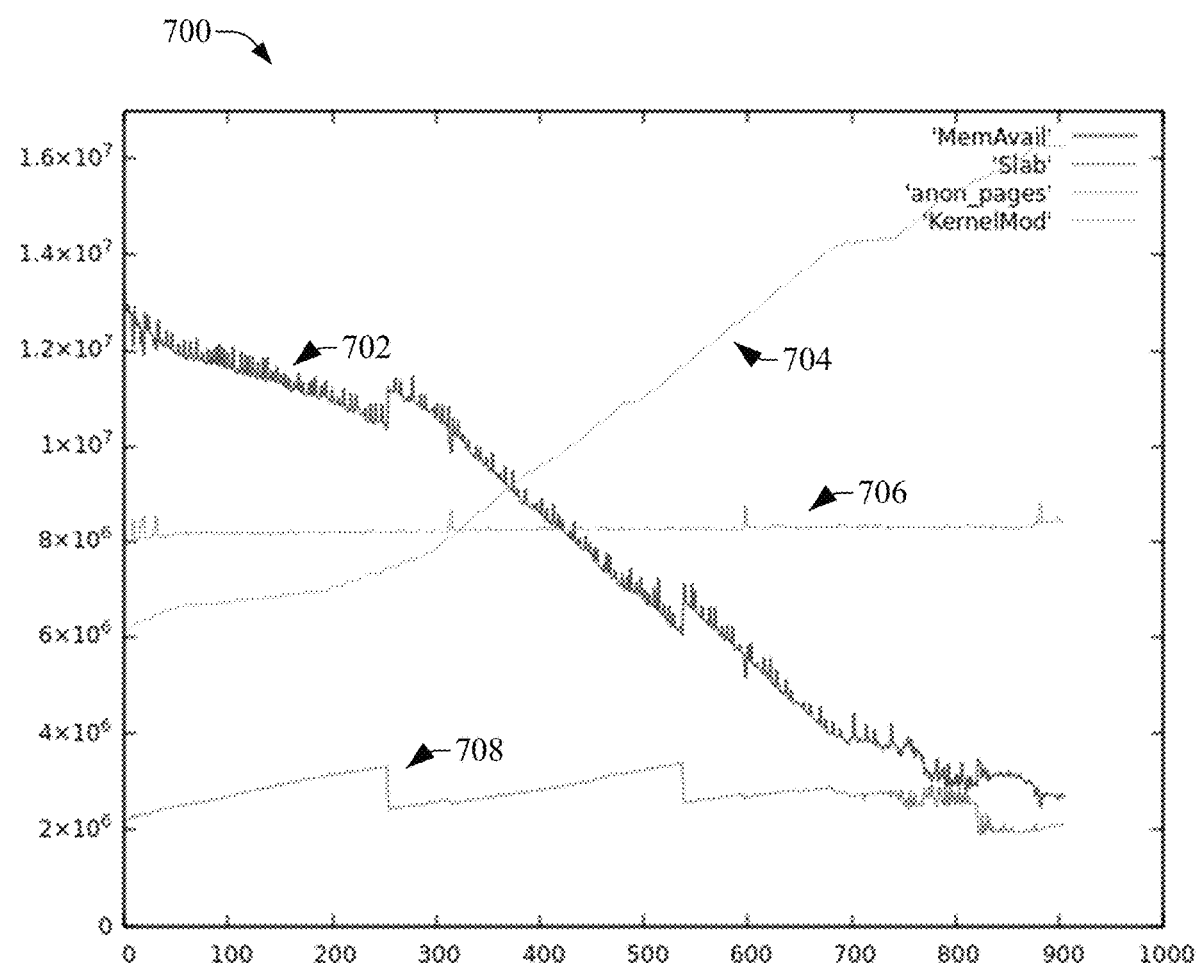
FIG. 7 illustrates an example memory usage data that was used to identify and remedy a memory leak associated with a kernel module, in accordance with various non-limiting example embodiments.

FIG. 7 depicts memory usage data 700 that identifies memory leaks associated with sever equipment, in accordance with illustrative embodiments. In this instance a memory leak was detected in a kernel driver associated with server equipment. The memory leak caused the available memory on a primary node and a secondary node to drop significantly over a few days. The primary node eventually ran out of memory and rebooted. The failover to the secondary node caused the secondary node to run out of memory and crashed before the primary node came up. The situation resulted in the server equipment being unavailable.

FIG. 7 plots the memory usage data collected from the affected system equipment, wherein the x-axis represents time and the y-axis represents allocated memory. The available memory (MemAvail) 702 trended down for several days, while the kernel module memory usage (KernelMod) 704 went up in tandem with the available memory (MemAvail) 702 tending down. The slab data (slab) 708 and the anonymous page data (anon_pages) 706 remained relatively stable. The trending data isolated the memory leak to the kernel modules.

Figure 11:
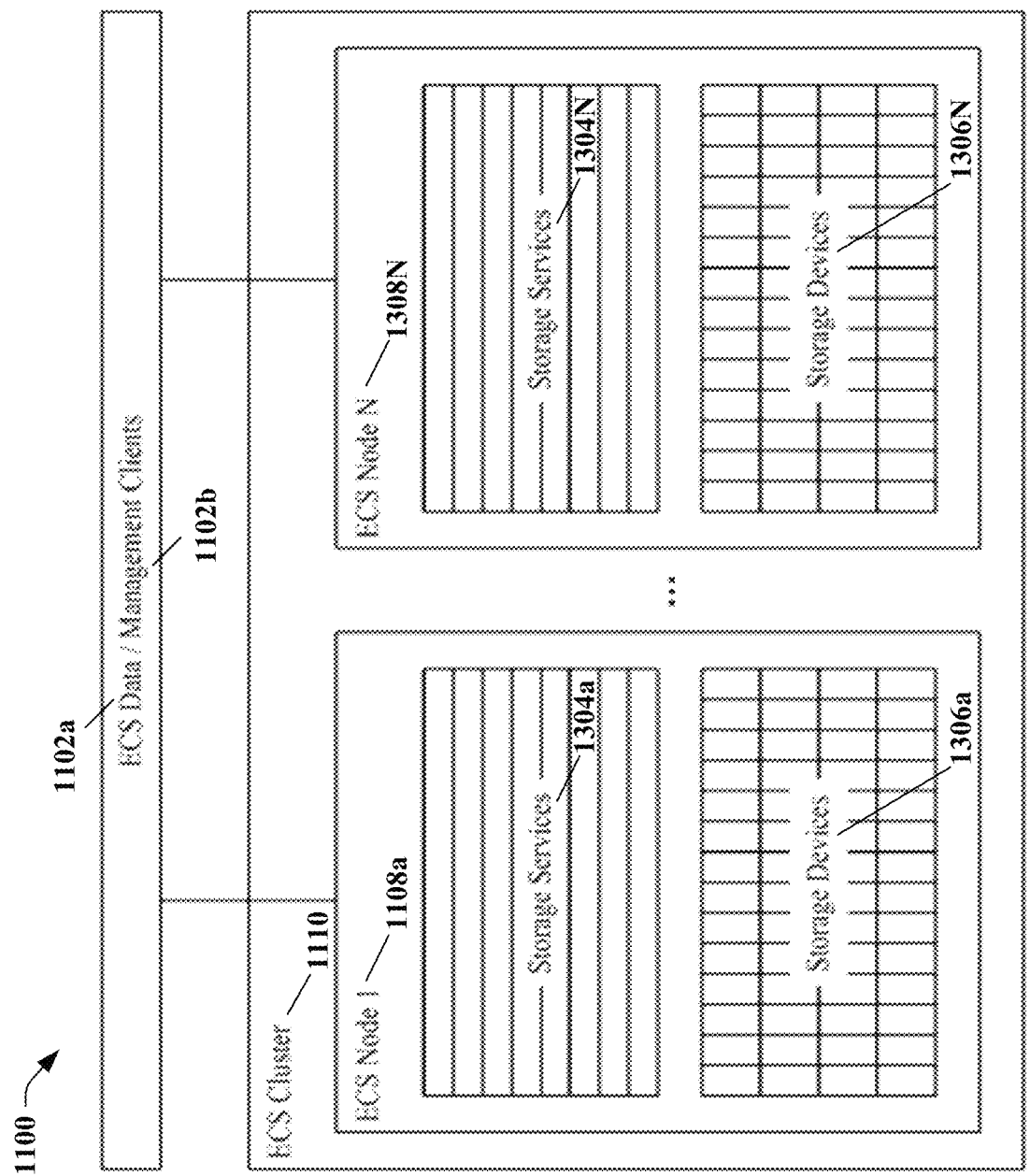
FIG. 11 illustrates an elastic cloud storage (ECS) system, in accordance with various non-limiting example embodiments.

In the following, FIG. 11 describes an example non-limiting cloud storage system in the non-limiting context of an ECS storage system, but for the avoidance of doubt, the subject embodiments can apply to any storage platform. For instance, in this regard, FIG. 11 illustrates an ECS storage system 1100 comprising a cloud-based object storage appliance in which corresponding storage control software comprising, e.g., ECS data client(s) 1102a, ECS management client(s) 1102b, storage service(s) 1104a . . . 1104N, etc. and storage devices 1106a . . . 1106N (e.g., storage media, such as physical magnetic disk media, etc. of respective ECS nodes of ECS cluster 1110) are combined as an integrated system with no access to the storage media other than through the ECS storage system 1100.

In this regard, ECS cluster 1110 comprises multiple nodes 1108a . . . 1108N, storage nodes, ECS nodes, etc. Each node is associated with storage devices 1106a . . . 1106N, e.g., hard drives, physical disk drives, storage media, etc. In embodiment(s), ECS node 1108a, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 1100 can be an append-only virtual storage platform that protects content from being erased or overwritten for a specified retention period. In particular, the ECS storage system 1100 does not employ traditional data protection schemes like mirroring or parity protection. Instead, the ECS storage system 1100 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 1100 can support storage, manipulation, and/or analysis of unstructured data on a massive scale on commodity hardware. As an example, the ECS storage system 1100 can support mobile, cloud, big data, and/or social networking applications. In another example, the ECS storage system 1100 can be deployed as a turnkey storage appliance, or as a software product that can be installed on a set of qualified commodity servers and disks, e.g., within a node, data storage node, etc. of a cluster, data storage cluster, etc. In this regard, the ECS storage system 1100 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Embodiments of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more embodiments of the disclosed subject matter as described herein. For example, an artificial intelligence system can be used to determine probabilistic likelihoods that code paths utilize operating system synchronization mechanism, as described herein.

A classifier can be a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various embodiments of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by variance engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1222, disk storage 1224, and/or memory storage 1246, further description of which is below. For instance, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
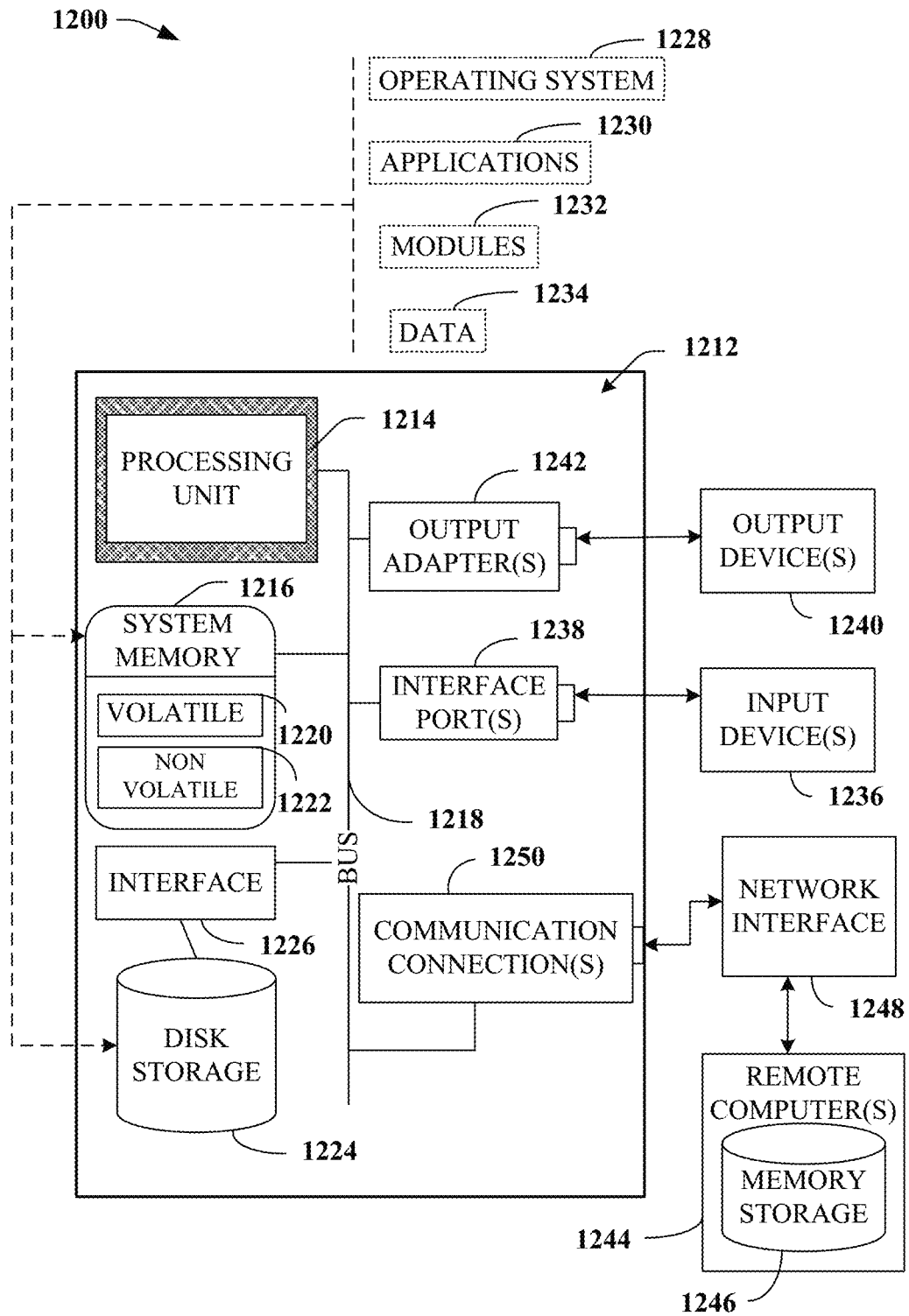
FIG. 12 illustrates a block diagram representing an illustrative non-limiting computing system or operating environment in which one or more parts of various non-limiting embodiments described herein can be implemented.

In order to provide a context for the various embodiments of the disclosed subject matter, FIG. 12, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated embodiments can also be practiced in distributed computing environments where tasks are performed by remote processing devices that are linked through a communication network; however, some if not all embodiments of the subject disclosure can be practiced on stand-alone computers. In a distributed computing environment, program modules can be located in both local and remote memory storage devices.

With reference to FIG. 12, a block diagram of a computing system 1200, e.g., system 120, operable to execute the disclosed systems and methods is illustrated, in accordance with an embodiment. Computer 1212 comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 comprises volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can comprise ROM, PROM, EPROM, EEPROM, or flash memory. Volatile memory 1220 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also comprises removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 comprise, for example, a serial port, a parallel port, a game port, a universal serial bus (USB), a wireless based port, e.g., Wi-Fi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 comprise, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable instructions that, when executed by the at least one processor, facilitate performance of operations, comprising:
      collecting, to a data slot of a defined data structure, a flow of memory usage data received from a resource monitoring process executing on the system;
      in response to determining a time value exceeding a defined threshold time value, closing the data slot;
      based on the memory usage data included in the data slot, executing a trend analysis process using the memory usage data as an input to the trend analysis process;
      in response to the trend analysis process determining a trend associated with the memory usage data, transmitting notification data representing the trend to a user equipment, wherein the defined data structure has a defined number of data slots; and
      in response to determining that a newest data slot of the defined data structure to be open exceeds the defined number of data slots, sending the memory usage data included in an oldest data slot of the defined data structure to data storage equipment.

2. The system of claim 1, wherein the data slot is a first data slot, and wherein the operations further comprising in response to closing the first data slot, opening a second data slot associated with the defined data structure and directing the flow of memory usage data to the second data slot.

3. The system of claim 1, wherein the data slot is associated with a count-down clock.

4. The system of claim 1, wherein the defined data structure comprises a defined group of data slots.

5. The system of claim 1, wherein the determining that the time value exceeds the defined threshold value is measured using a system clock associated with the data slot.

6. The system of claim 1, further comprising, in response to determining the trend in the memory usage data, generating, based on a use of an artificial intelligence process, recommendation data, wherein the recommendation data is transmitted to the user equipment.

7. The system of claim 1, further comprising, in response to determining that the collecting of memory usage data is an initial collecting of memory usage data after the system commenced operation, initializing the defined data structure.

8. The system of claim 1, further comprising, in response to determining that the collecting of memory data is an initial collecting of memory usage data subsequent to the system becoming functional after a supply of electrical power to the system, resetting a clock associated with the data structure.

9. The system of claim 8, wherein the determining that the collecting of memory data is the initial collecting of memory usage data is determined as a function of a clock that was initiated at the supply of electrical power to the system.

10. The system of claim 9, wherein the clock is initiated with a defined value determined based on prior data representative of prior startup events associated with the system and when the system achieved an equilibrium state.

11. The system of claim 10, wherein the equilibrium state is a state in which the system does not experience memory usage variations that exceed an upper variation threshold value and fall below a lower variation threshold value.

12. A method, comprising:
   in response to an initiation request received from a user equipment, instantiating, by a system comprising a processor, a defined data structure comprising a group of data slots;
   directing, by the system, to a data slot of the group of data slots, a flow of memory usage data received from a resource monitoring process executing on the system;
   in response to determining a time value exceeding a defined threshold time value, closing, by the system, the data slot;
   based on the memory usage data included in the data slot, executing, by the system, a trend analysis process using the memory usage data as an input to the trend analysis process;
   in response to the trend analysis process determining an upward trend associated with the memory usage data, transmitting, by the system, notification data representing the upward trend to a user equipment, wherein the group of data slots has a defined number of data slots; and
   in response to determining that a newest data slot of the group of data slots to be open exceeds the defined number of data slots, sending, by the system, the memory usage data included in an oldest data slot of the group of data slots to data storage equipment.

13. The method of claim 12, wherein the data slot is a first data slot of the group of data slots, and further comprising, in response to the time value exceeding the defined threshold time value, sending, by the system, the flow of memory usage data to a second data slot of the group of data slots.

14. The method of claim 12, wherein the defined data structure is a queue and the group of data slots represent queue slots.

15. The method of claim 12, further comprising, in response to transmitting the notification data to the user equipment, sending, by the system, the memory usage data used to perform the trend analysis process to archival storage equipment.

16. The method of claim 12, wherein the memory usage data included in the data slot is first memory usage data included in a first data slot, and further comprising performing, by the system, the trend analysis process using the first memory usage data and second memory usage data included in a second data slot of the group of data slots.

17. A non-transitory machine-readable medium comprising instructions that, in response to execution, cause a system comprising a processor to perform operations, comprising:
- receiving, into a data slot of a defined data structure, a flow of memory usage data sent by a resource monitoring process operational on the system;
- in response to determining a time value exceeding a defined threshold time value, closing the data slot;
- based on the memory usage data included in the data slot, executing a trend analysis process using the memory usage data as an input to the trend analysis process;
- in response to the trend analysis process determining a trend associated with the memory usage data, transmitting notification data representing the trend and recommendation data representing a suggestion to reverse the trend to a user equipment, wherein the defined data structure has a defined number of data slots; and
- in response to determining that a newest data slot of the defined data structure to be open exceeds the defined number of data slots, sending the memory usage data included in an oldest data slot of the defined data structure to data storage equipment.

18. The non-transitory machine-readable medium of claim 17, wherein the memory usage data is first memory usage data, wherein the data slot is a first data slot, wherein the operations further comprise generating the recommendation data using a machine learning process, wherein the first memory usage data and second memory usage data included in a second data slot serve as input to the machine learning process, and wherein the second memory usage data included in the second data slot comprises an earlier representation of memory usage data.

19. The non-transitory machine-readable medium of claim 17, wherein the defined data structure is a linked list of a defined linked list length and the data slot is a data storage object attached to a head end of the linked list.

20. The non-transitory machine-readable medium of claim 17, wherein in response to transmitting the notification data to the user equipment, sending the memory usage data used to perform the trend analysis process to archival storage equipment.

* * * * *